(12) United States Patent
Jeyachandran et al.

(10) Patent No.: US 6,625,735 B2
(45) Date of Patent: *Sep. 23, 2003

(54) INFORMATION PROCESSING APPARATUS AND METHOD FOR APPROPRIATELY TERMINATING PROCESSING

(75) Inventors: Suresh Jeyachandran, Yokohama (JP); Masayuki Takayama, Kashiwa (JP); Masanori Wakai, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/178,886

(22) Filed: Oct. 27, 1998

(65) Prior Publication Data

US 2003/0079148 A1 Apr. 24, 2003

(30) Foreign Application Priority Data

Oct. 28, 1997 (JP) .............................. 9-295516

(51) Int. Cl.$^7$ .............................. G06F 11/30; H04L 9/00
(52) U.S. Cl. .......................... 713/202; 713/201; 705/67; 705/64; 705/54; 709/225; 709/229
(58) Field of Search ................................ 713/202, 201, 713/200; 709/225, 229; 705/51, 54, 64, 67

(56) References Cited

U.S. PATENT DOCUMENTS

| | | | | |
|---|---|---|---|---|
| 5,204,947 A | * | 4/1993 | Bernstein et al. ........... | 395/157 |
| 5,297,249 A | * | 3/1994 | Bernstein et al. ........... | 395/156 |
| 5,572,696 A | * | 11/1996 | Sonobe ....................... | 395/412 |
| 5,576,946 A | * | 11/1996 | Bender et al. .............. | 364/146 |
| 5,655,077 A | * | 8/1997 | Jones et al. ............ | 395/187.01 |
| 6,067,622 A | * | 5/2000 | Moore ........................ | 713/200 |
| 6,088,451 A | * | 7/2000 | He et al. ...................... | 380/25 |
| 6,223,284 B1 | * | 4/2001 | Novoa et al. ............... | 713/100 |
| 2001/0012122 A1 | * | 8/2001 | Veda ......................... | 358/1.15 |

OTHER PUBLICATIONS

"Password Control of Applications is a multitasking environment", IBM Tech Discl Bulletin, Sep. 1993, pp. 1–4.*

"Device Exerciser having multiple Fixit Options, including a Lock Act", IBM Tech. Discl. Bulletin, pp. 1–3, Feb. 1991.*

* cited by examiner

Primary Examiner—Norman M. Wright
(74) Attorney, Agent, or Firm—Fitzpatrick, Cella, Harper & Scinto

(57) ABSTRACT

When termination of information processing is instructed, the entry of a password is requested and the password that is entered is identified. When the password that is input is a password for a manager, the system is shut down; when it is a password for a registered user, the client process is terminated; but when it is a password for a person other than those two, permission to end the processing is not granted. Thus, the type of end process that is performed can be controlled in accordance with the identity of a user. As for the client process, upon receiving an end instruction from a user the client internally performs a corresponding end process, instead of requesting that the process be performed by the server process.

26 Claims, 11 Drawing Sheets

INFORMATION PROCESSING APPARATUS AND METHOD FOR APPROPRIATELY TERMINATING PROCESSING

BACKGROUND OF THE INVENTION

1. Field of the Invention

The present invention relates to an information processing apparatus and to a method for appropriately terminating processing that is currently being performed.

2. Related Background Art

Conventionally, to terminate the use of a device, for example, a computer performs a predetermined end process in accordance with an end instruction. However, in an environment wherein multiple users can employ a device, problems may arise if they freely terminate the processing that is currently being performed or the operation of the device.

For a client/server system, for example, there is not merely one end process that is required in accordance with the situation, instead, there are multiple end processes, such as the termination of a client process or the shutting down of a system. The termination of a client process should be the responsibility of a client processing unit.

SUMMARY OF THE INVENTION

It is, therefore, one objective of the present invention to provide an information processing apparatus and method for preventing the execution of an end process that a user is not permitted to perform.

It is another objective of the present invention to provide an information processing apparatus and method for using a password to control an end process.

It is an additional objective of the present invention to provide an information processing apparatus and a method for appropriately terminating a client process in a client/server system.

It is a further objective of the present invention to provide an information processing apparatus and method for performing a specific process at a client processing unit in a client/server system.

According to one aspect, the present invention, which achieves these objectives, relates to an information processing apparatus comprising:

end instruction means for instructing termination of information processing;

end processing means for performing an end process when termination is instructed by the end instruction means;

input means for entering a password; and control means for identifying the password and for controlling the end process performed by the end processing means based on the password that is identified.

According to another aspect, the present invention, which achieves these objectives, relates to an information processing apparatus comprising:

client means for, in accordance with an operation performed by a user, generating and transmitting a request for the performance of a process, and for receiving operating screen information and providing the operating screen information to the user;

server means for interpreting the request and adding object information to a database, and for generating and transmitting operating screen information to the client means; and execution means for monitoring the database, and for detecting object information that is to be processed and for processing the object information, wherein, in accordance with a specific operation selected by the user, the client means internally performs a process, instead of generating and transmitting a request for the performance of the process.

According to still another aspect, the present invention, which achieves these objectives, relates to an information processing method comprising:

an end instruction step of instructing termination of information processing;

an end processing step of performing an end process when termination is instructed at the end instruction step;

an input step of entering a password; and a control step of identifying the password, and of controlling the end process at the end processing step based on the password that is identified.

According to yet another aspect, the present invention, which achieves these objectives, relates to an information processing method comprising:

a client process for generating and transmitting a request for performing a process in accordance with an operation performed by a user;

a server process for interpreting the request and adding object information to a database, and for generating and transmitting operating screen information to the client process; and an execution process for monitoring the database and detecting object information that is to be processed, and for processing the object information, wherein in the client process, the operating screen information is received and provided for the user, and wherein, in accordance with a specific operation selected by the user, a corresponding process is performed by the client process, instead of a request for the performance of the process being generated and transmitted.

According to a further aspect, the present invention, which achieves these objectives, relates to a computer-readable storage medium on which a program for controlling a computer is stored, the program comprising codes for causing the computer to operate;

an end instruction step for instructing termination of information processing;

an end processing step of performing an end process when termination is instructed at the end instruction step;

an input step of entering a password; and a control step of identifying the password and of controlling the end process at the end processing step based on the password that is identified.

According to one further aspect, the present invention, which achieves these objectives, relates to a computer-readable storage medium on which a program for controlling a computer is stored, the program comprising:

a client process for, in accordance with an operation performed by a user, generating and transmitting a request for the performance of a process, and for receiving operating screen information and providing the operating screen information to the user;

a server process for interpreting the request and adding object information to a database, and for generating and transmitting operating screen information to the client process; and an execution process for monitoring the database and for detecting object information that is to be processed, and for processing the object information, wherein in accordance with a specific operation selected by the user, a corresponding process is performed by the client process, instead of a request for the performance of the process being generated and transmitted.

Other objectives and advantages, in addition to those discussed above, will become apparent to those skilled in the art during the course of the description of a preferred embodiment of the invention that follows. In the description, reference is made to accompanying drawings, which form a part of the description and which illustrate an example of the invention.

DETAILED DESCRIPTION OF THE PREFERRED EMBODIMENT

Figure 1:
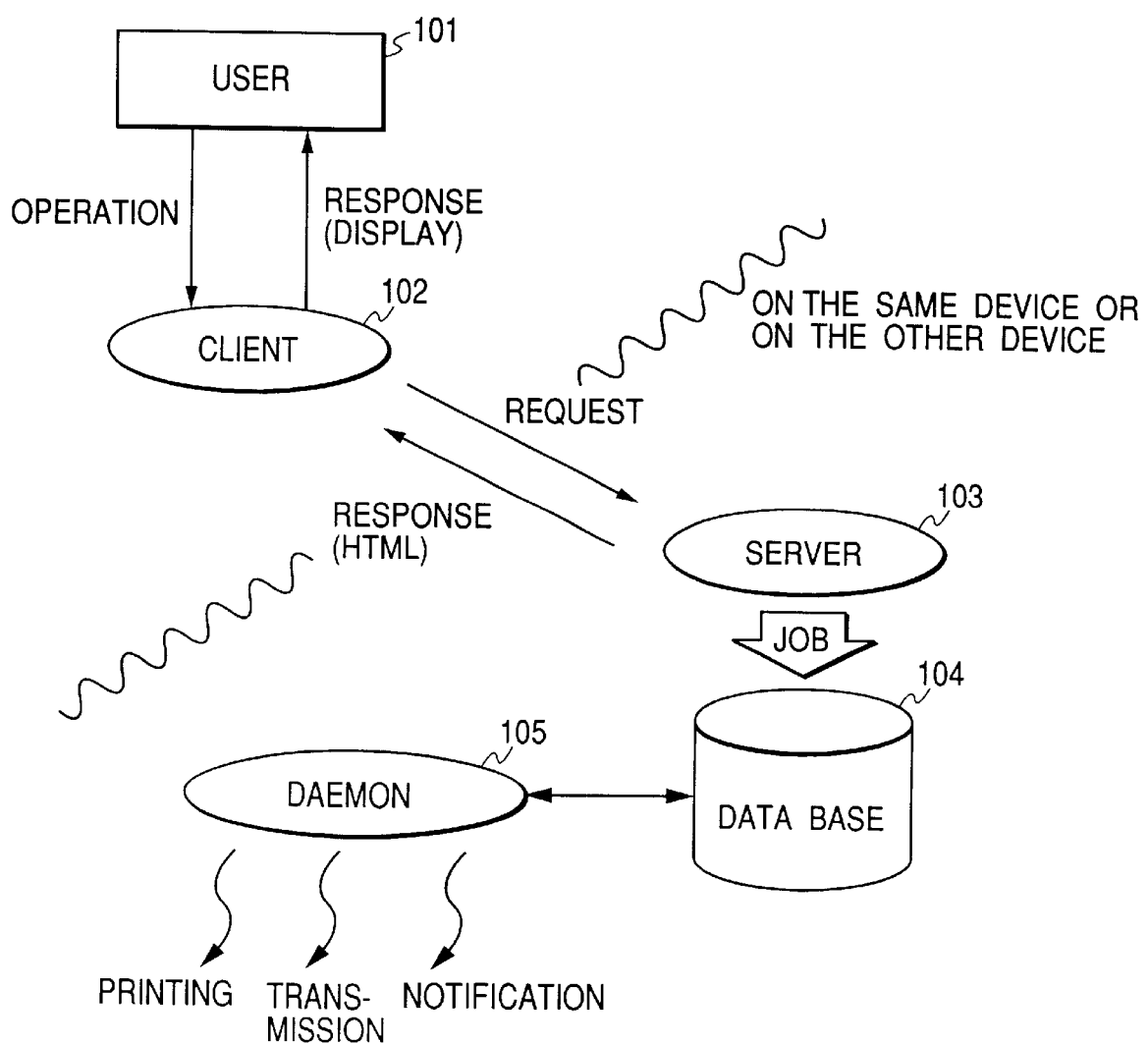
FIG. 1 is a diagram showing the functional arrangement for one embodiment of the present invention.

The preferred embodiment of the present invention will now be described while referring to the accompanying drawings.

A detailed explanation will be given for one embodiment of the present invention while referring to the drawings.

In FIG. 1 is shown the functional arrangement of the embodiment. The relationship existing between a user 101, a client 102, a server 103, a database 104, and a daemon 105 is shown. The client 102 and the server 103 may be provided either on the same device, or on separate devices connected by a network.

When the user 101 performs a specific operation for the client 102, the client 102 generates a request that corresponds to the operation, and transmits it to the server 103. The server 103 interprets the received request, and communicates with the database 104 for the deletion or the addition of a job, or to obtain data. As a result, the server 103 prepares a corresponding HTML page as needed, and transmits it to the client 102. The client 102 displays the received HTML page, and permits the user 101 to initiate a new operation.

Jobs stored in the database 104 are monitored by the daemon 105. The daemon 105 performs the printing, the transmission, or the notification required for a job for which the performance condition has been satisfied.

Figure 2:
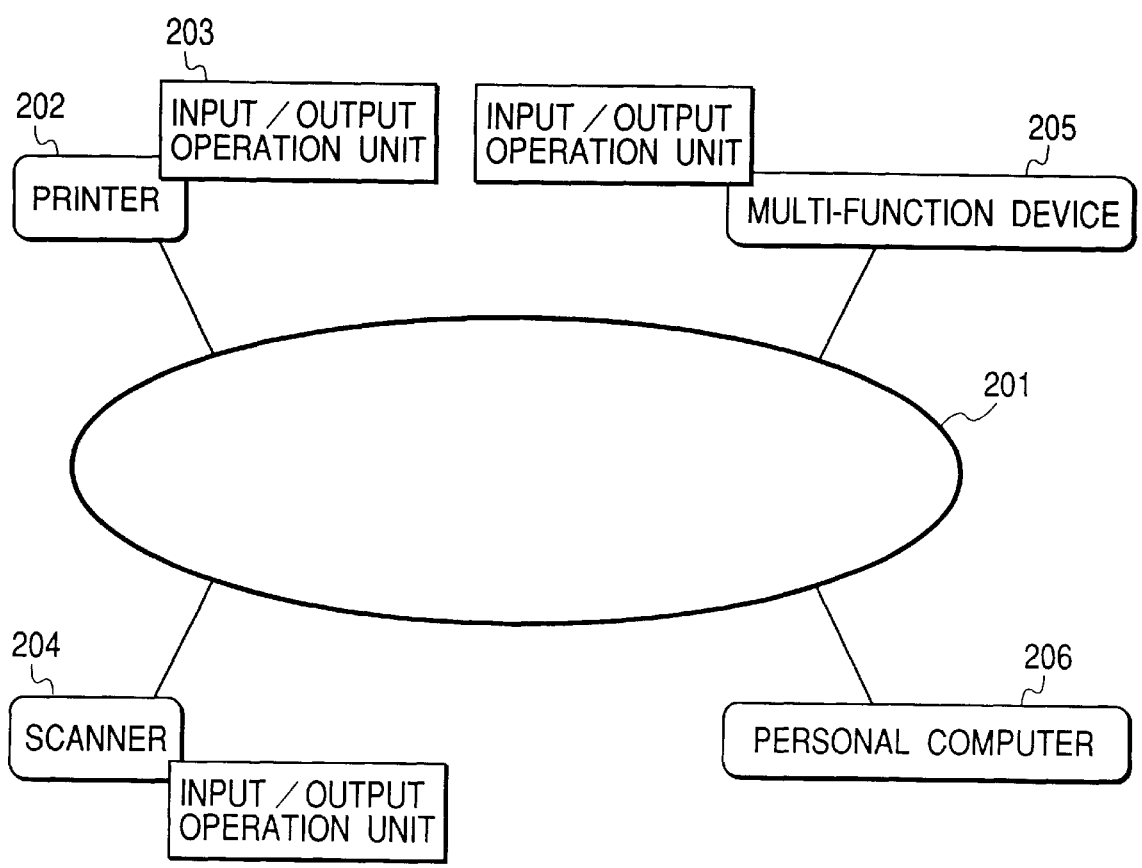
FIG. 2 is a diagram illustrating the system configuration according to the embodiment of the present invention.

FIG. 2 is a diagram showing the system configuration according to the embodiment.

In FIG. 2, various devices are connected to a network 201, and data are exchanged across the network 201. A printer 202, which prints data received via the network 201, includes an input/output operation unit 203. The input/output operation unit 203 provides various displays for a user, and accepts instructions from the user. A scanner 204 and a multi-function device 205 also include the same input/output operation unit. The scanner 204 optically reads data printed on paper, and the multi-function device 205 includes the functions both of the printer 202 and of the scanner 204. A personal computer 206 creates documents and images, and manages personal data, such as mail and a schedule for the user.

The printer 202, the scanner 204, the multi-function device 205, and the personal computer 206 can each serve as the client and the server described above.

Figure 3:
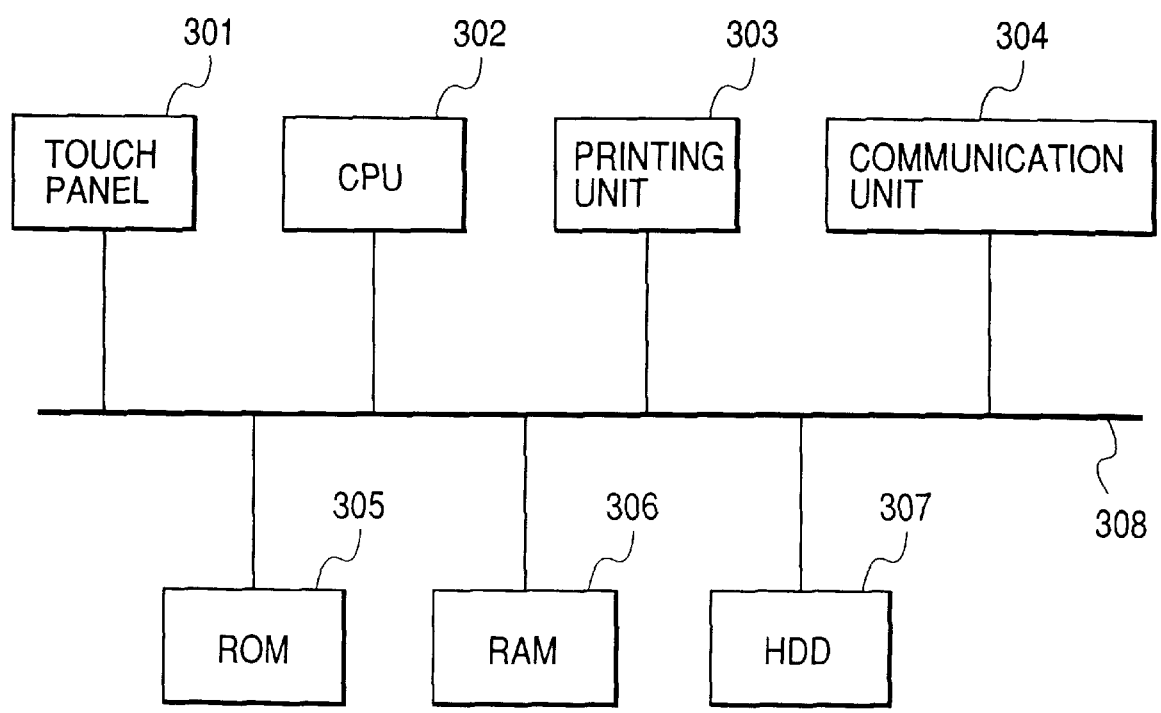
FIG. 3 is a functional block diagram illustrating a printer according to the embodiment of the present invention.

FIG. 3 is a functional block diagram illustrating the printer 202 according to the embodiment.

In FIG. 3, a touch panel 301 is used to display a printer status and a menu screen for a user, who by touching the screen can select an item listed on the menu. The user can also enter characters by using a keyboard that is displayed on the screen. Instead of the touch panel 301, an ordinary display unit and a keyboard can be prepared.

A CPU 302 executes various programs, to include procedures that will be described later while referring to the flowcharts, and controls the individual sections connected by a system bus 308. A printing unit 303 prints data on paper, etc. A communication unit 304 exchanges data, to include commands and statuses, with a desktop or with a scanner, or with another printer connected across a network.

A ROM 305 is used to store fixed data and programs. A RAM 306 is used to temporarily store data and programs. A hard disk drive (HDD) 307 is used to permanently store programs and data, and is employed as the above described database 104. The system bus 308 is used as a medium for connecting the above described sections, and for the exchange of data, addresses and control signals among these sections. The programs, including the procedures that will be described later while referring to the flowcharts, may be stored in the ROM 305, or may be loaded from the HDD 307 into the RAM 306, as needed, before the processing has begun or while it is in progress.

Figure 4:
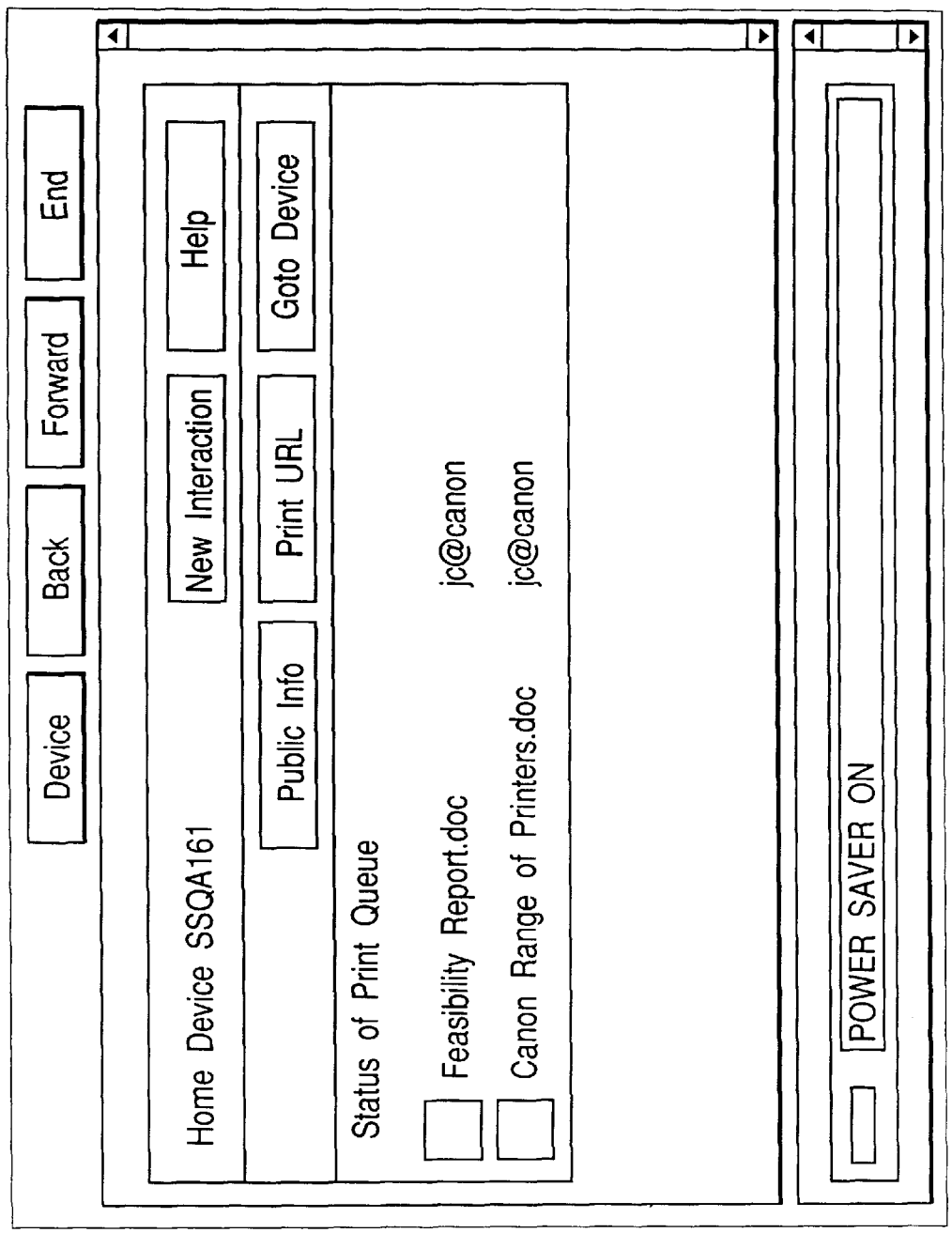
FIG. 4 is a diagram showing an example screen for an initial menu.
Figure 5:
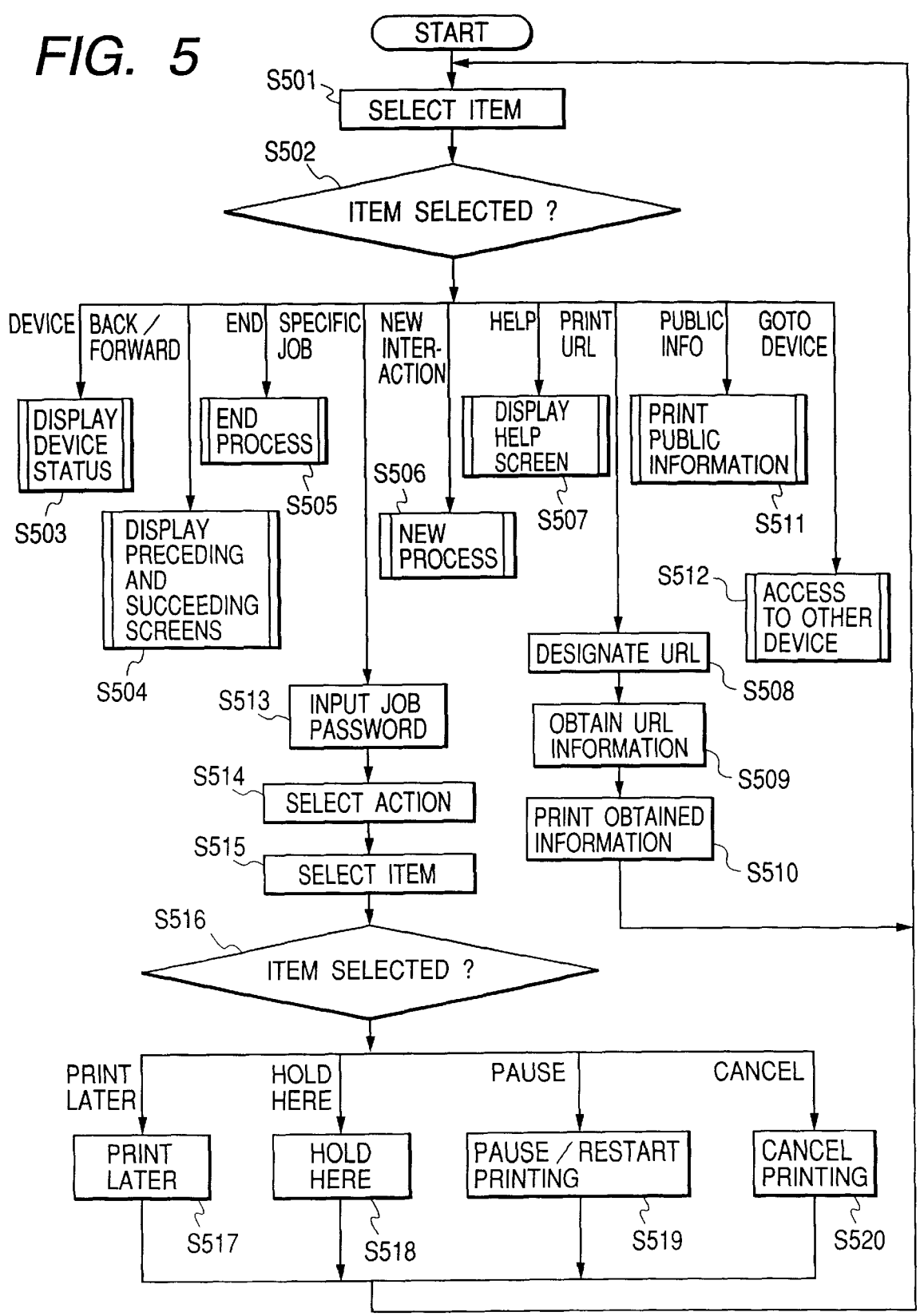
FIG. 5 is a flowchart showing the processing that begins with the initial menu screen.

In FIG. 4 is shown an example initial menu screen. FIG. 5 is a flowchart showing the processing that begins with the initial menu screen. When jobs are present in a print queue, they are displayed as a list on the status screen. As information for each of the individual jobs, the name of the job and the name of the submitter are displayed.

At step S501 a user selects a desired item from the initial menu. At step S502 the selected item is identified and a corresponding new screen is displayed.

When "Device" is selected, at step S503 the device status is displayed. When "Back" or "Forward" is selected, at step S504 the screen that preceded or that succeeds the current screen is displayed. When "End" is selected, at step S505 an end process is performed. When "New Interaction" is selected, at step S506 a new process is performed. When "Help" is selected, at step S507 the help screen for the current state is displayed.

"When Print URL" is selected, the screen is changed to a "Print URL" screen. When, at step S515, a URL is indirectly entered or is designated by a reference, and "Go" is selected, at step S516 information is obtained and previewed. At step S517 the contents of the information that have been confirmed are printed. The screen is thereafter returned to the initial menu screen.

When "Public Info (public information)" is selected, at step S515 program control advances to the process for public information, and the screen is changed to a "public information process" screen. When "Goto Device (another device)" is selected, at step S512 a setup screen for accessing another device is displayed, and the process for accessing another device is performed.

In addition, a job in a print queue can be selected on the initial screen. To select a job, a button displayed in front of the name of the desired job is touched. When a specific job is thus selected, at step S513 a password input screen is displayed. A password is then entered, and when it matches the password for the selected job, a setup screen is displayed for a process that corresponds to the job that was selected from the print queue.

Following this, at step S514 an action type is selected for the selected job, and at step S515 an appropriate time for the action type is set. When "Print Later" is selected as an action type, at step S517 the print time can be designated. When "Hold Here" is selected, at step S518 the length of time for the holding period can be set.

When "Pause/Restart Printing" is selected, at step S519 the printing is temporarily halted, and the screen is returned to the initial menu screen to wait for the selection of "Pause/Restart Printing" (for the depression of the same button). When "Cancel Printing" is selected, at step S520 a print job is deleted from the print queue, and "Cancel" is recorded in the history as the action taken for this job. The screen is then returned to the initial screen.

Figure 6:
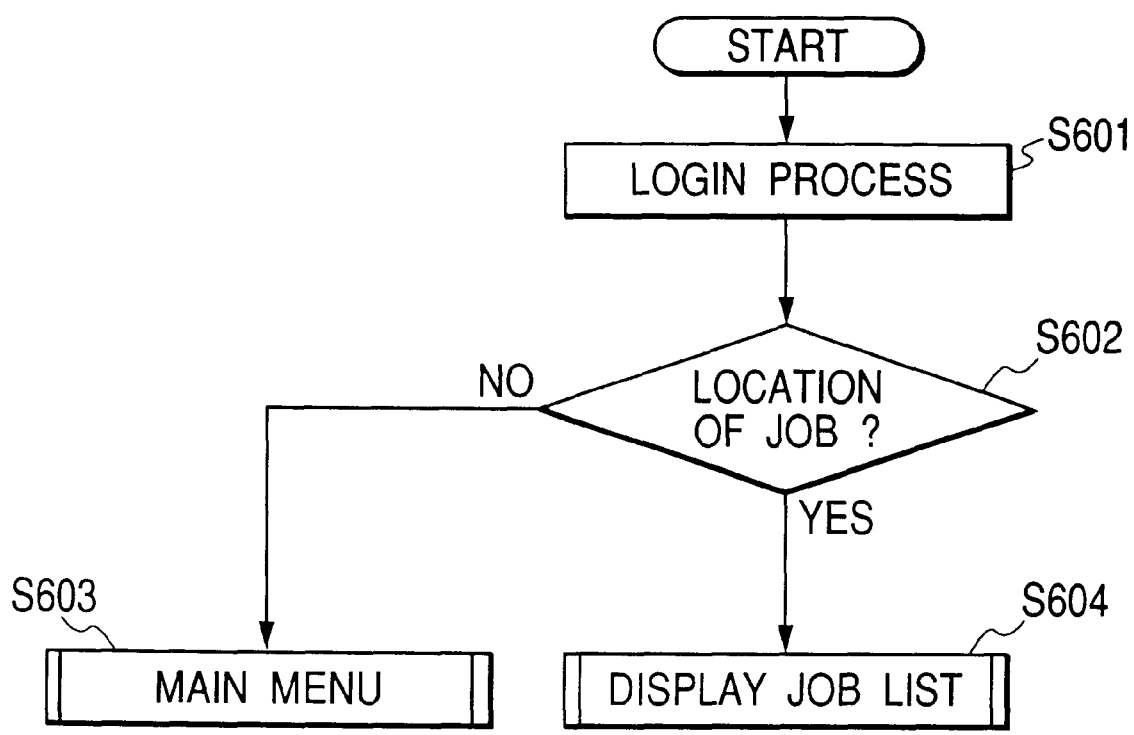
FIG. 6 is a flowchart showing the login processing.

FIG. 6 is a flowchart showing the login processing performed when a new process is selected on the initial menu. At step S601 a "Login" screen is displayed, and the identifier that a user has entered is examined. When a login is permitted, at step S602 a check is performed to determine whether there are any effective jobs (pending jobs) present for the user who has just logged in. If there are such unprocessed jobs, at step S604 a list of them is displayed and an action for a selected job is performed. When there are no unprocessed jobs, at step S603 the main menu is displayed to initiate the performance of the processing that begins with the main menu, which will be described later while referring to FIG. 8.

Figure 7:
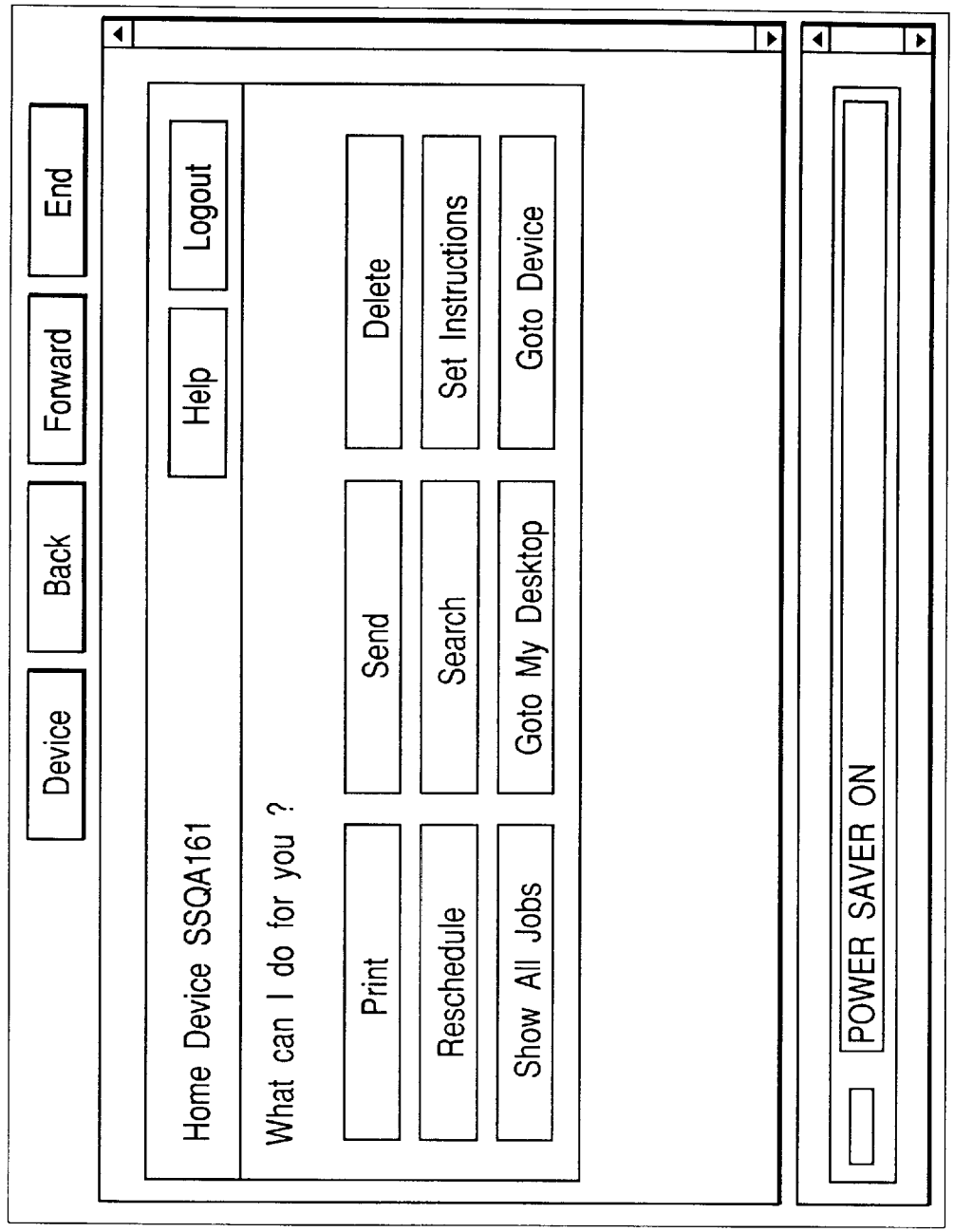
FIG. 7 is a diagram showing an example main menu.
Figure 8:
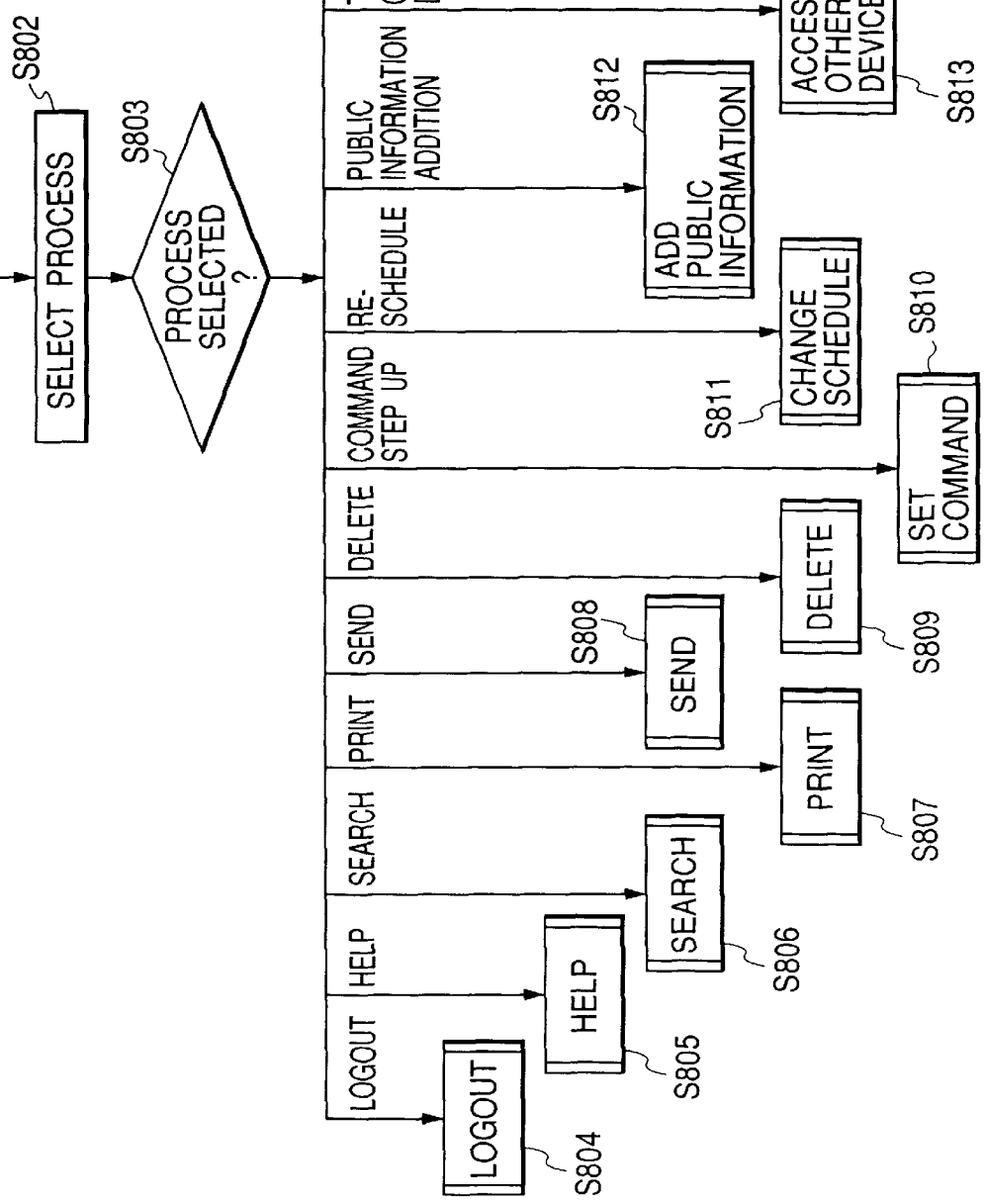
FIG. 8 is a flowchart showing the processing that begins with the main menu.

FIG. 7 is a diagram showing an example main menu, and FIG. 8 is a flowchart showing the processing that begins with the main menu. In the flowchart, the shifting of the screen from the main menu and the flow of the process are shown. At step S801 the main menu is displayed, and at step S802 a process (action) is selected.

When "Logout" is selected at step S802, at step S804 the logout process is performed. When "Help" is selected, at step S805 the help process is performed. When "Search" is selected, at step S806 the search process is performed. When "Print" is selected, at step S807 the printing process is performed. When "Send" is selected, at step S808 the transmission process is performed. When "Delete" is selected, at step S809 the deletion process is performed. When "Set Instructions" is selected, at step S810 the command setup process is performed. And when "Reschedule" is selected, at step S811 the rescheduling process is performed.

When the addition of public information is selected, at step S812 public information is added. When "Goto Device" is selected, at step S813 another device is accessed. When "Goto My Desktop" is selected, at step S814 the desktop is accessed. When "Device" is selected, at step S815 the status of the apparatus is displayed. And when "End" is selected, at step S816 the end process is performed that will be described in detail while referring to FIG. 9.

Figure 9:
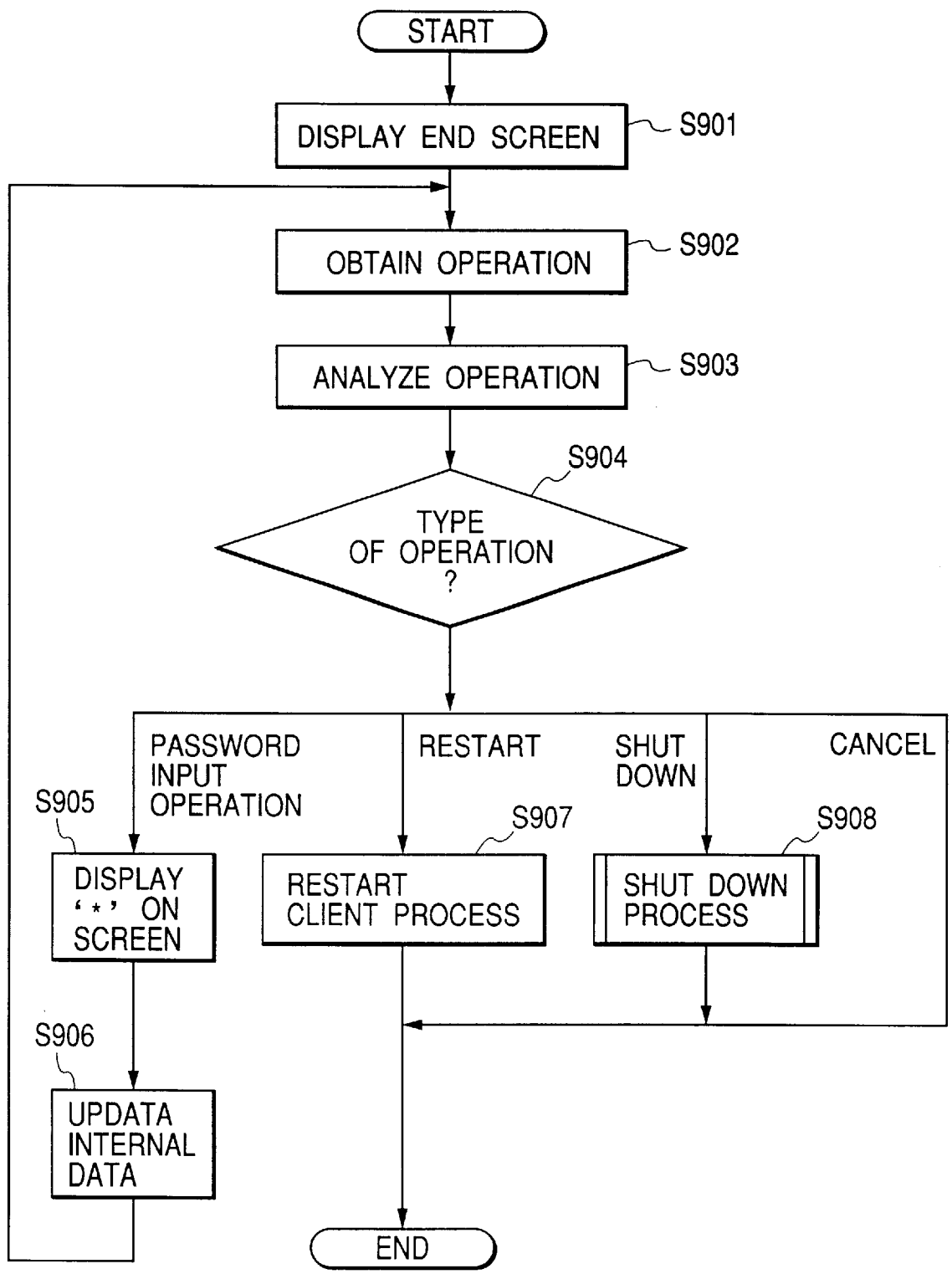
FIG. 9 is a flowchart showing the end processing.

FIG. 9 is a flowchart showing the end processing performed when the End button displayed in the upper right of each operating screen is selected.

When a user enters information on any operating screen displayed by the client, the client processing unit determines whether the operation selected by the user should be handled by the client or by the server.

In this embodiment, the operating buttons displayed on the operating screen are displayed on a screen holding an HTML page received by the server. When the user selects one of the buttons, in the client process the selected operation is converted into a corresponding HTML request, which is transmitted to the server. The server then performs a corresponding process.

The End button in the upper right of each operating screen is one that is written over the HTML page by the client side. When the user selects the End button, therefore, it is assumed that this process should be handled by the client, and the end process in FIG. 9 is initiated by the client.

Figure 11:
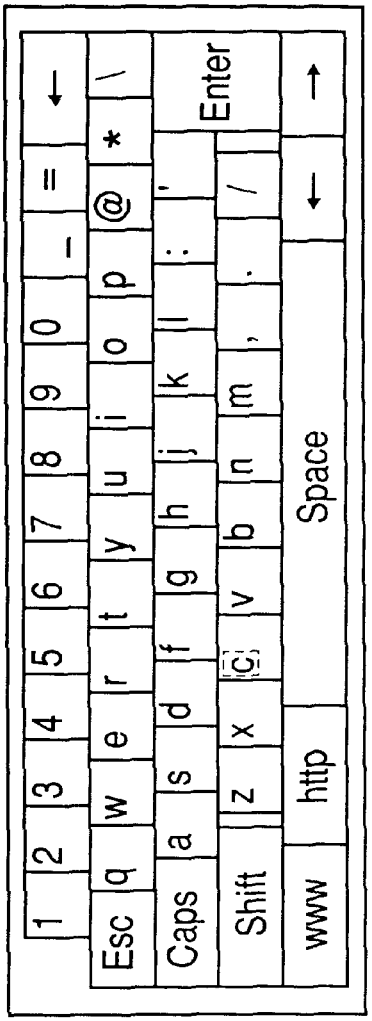
FIG. 11 is a diagram showing an example end screen.

When the end process is initiated, at step S901 the end screen is displayed. FIG. 11 is a diagram showing an example end screen. At step S902 the contents of the operation selected by the user are obtained and at step S903 they are analyzed. At step S904 program control branches in accordance with the operation type.

When a password is input by the user, at step S905 "*" is displayed on the screen in order to affirm that the input by the operator was accepted. At step S906 the operator input password data that are internally held are updated. Program control then returns to step S902 to accept a new user operation.

When "Restart" is selected by the user, at step S907 the client process that is currently being performed is terminated and is then restarted. The processing is thereafter terminated.

Figure 10:
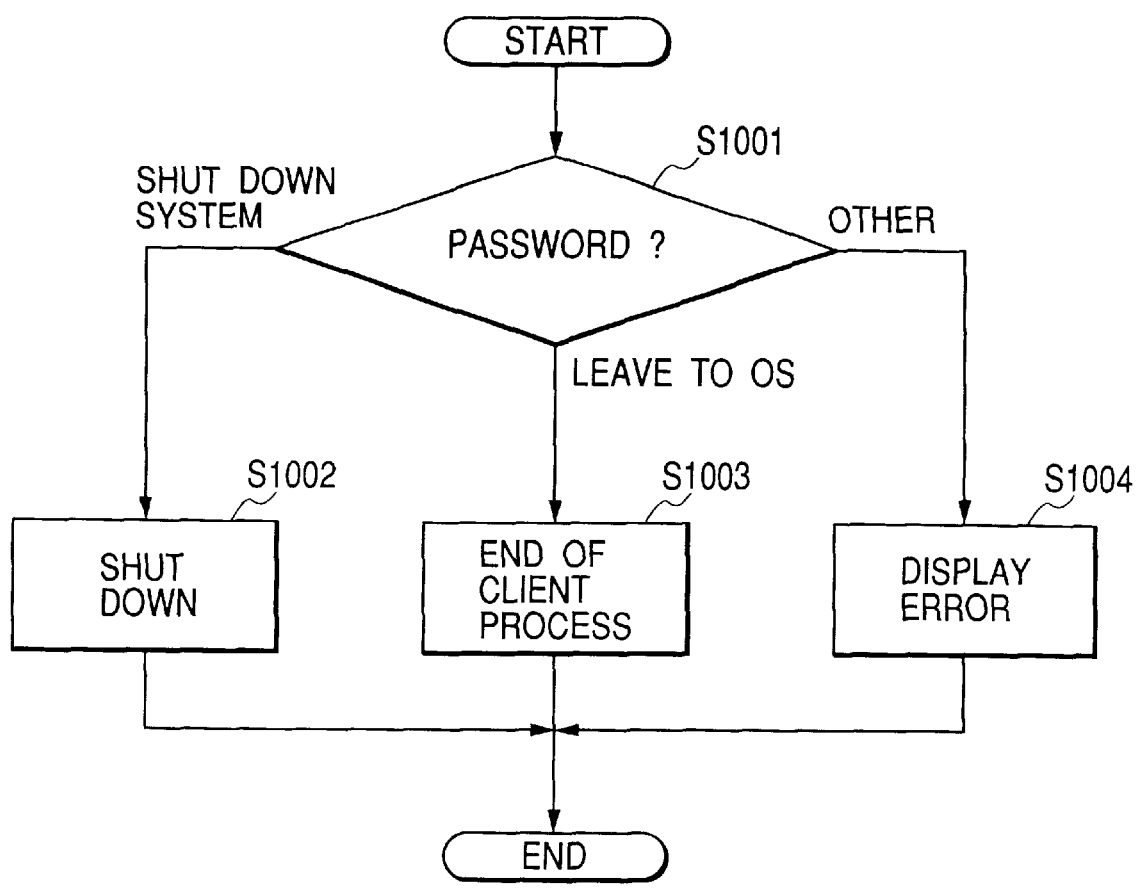
FIG. 10 is a flowchart showing the shutdown processing.

When "Shut Down" is selected by the user, at step S908 the shutdown process in FIG. 10 is performed, and the processing is thereafter terminated.

FIG. 10 is a flowchart showing the shutdown processing. For this processing, a different operation is performed in accordance with a password entered by the user.

When the shutdown process is initiated, at step S1001 program control branches in accordance with the password that is entered.

When the password entered by the user matches the password for a shutdown system that is set in advance by a manager, at step S1002 the system is shut down, and the processing is terminated.

When the password entered by the user matches the password for "leave to OS" that is set in advance by the manager, at step S1003 only the client process is terminated, and the control right is returned to the OS. The processing is thereafter terminated.

When the password entered by the user does not match either password that is set in advance by the manager, at step S1004 an error message is displayed, and the processing is thereafter terminated. When "Cancel" is selected by the user, the processing is terminated without any further process being performed.

With this arrangement, for example, only the manger can shut down the system, and only a specific user can terminate the client process.

The present invention may be applied for an apparatus constituted by a single device, or for a system constituted by a plurality of apparatuses. For implementing the present invention, a storage medium on which is stored software program code for implementing the functions described in the above embodiment may be supplied to an apparatus or to a system, and the computer in the apparatus or in the system may read the program code from the storage medium.

In addition, the scope of the present invention includes not only a case where the functions in the embodiment can be performed when program code is read and executed by the computer, but also a case where, in accordance with an instruction contained in the program code, an OS running on the computer, etc., can perform the processing required to accomplish the functions included in the above embodiment.

The storage medium on which such program code is recorded constitutes the present invention.

Although the present invention has been described in its preferred form with a certain degree of particularity, many apparently widely different embodiments of the invention can be made without departing from the spirit and the scope thereof. It is to be understood that the invention is not limited to the specific embodiments described herein, except as defined in the appended claims.

What is claimed is:

1. An information processing apparatus comprising:
   end instruction means for instructing termination of information processing;
   request means for requesting a user to enter a password when termination is instructed by said end instruction means;
   identification means for identifying a password entered by the user;
   process termination means for terminating a process that is being executed and for returning control to an operating system when the termination is instructed and the identified password is a first predetermined password; and
   shut-down means for shutting down said apparatus when the termination is instructed and the identified password is a second predetermined password.

2. An information processing apparatus according to claim 1, wherein said first predetermined password is a password for an administrator.

3. An information processing apparatus according to claim 1, wherein said second predetermined password is a password for a specific user.

4. An information processing apparatus according to claim 1, wherein said information processing includes the reading of information or the printing of information.

5. An information processing apparatus according to claim 1, further comprising:
   client means for, in accordance with an operation selected by a user, either performing a process or generating and transmitting a request for the performance of a process, and for generating or receiving operating screen information and for providing the user with said operating screen information;
   server means for interpreting said request and adding object information to a database, and for generating and transmitting operating screen information to said client means; and
   execution means for monitoring said database and for detecting object information that is to be processed, and for processing said object information,
   wherein said client means includes said process termination means and said shut-down means, and generates and provides, for the user, operating screen information for said process termination means and said shut-down means.

6. An information processing apparatus according to claim 5, wherein said client means synthesizes said operating screen information generated by said client means with said operating screen information received from said server means, and provides said user the resultant information.

7. An information processing apparatus according to claim 6, wherein said client means determines whether a process is to be performed or whether a performance request is to be generated and transmitted, in accordance with whether said operating screen information concerning the operation selected by said user is generated by said client means, or is received from said server means.

8. An information processing apparatus comprising:
   client means for, in accordance with an operation performed by a user, generating and transmitting a request for the performance of a process corresponding to the operation, and for receiving operating screen information and providing said operating screen information to the user;
   server means for interpreting said request and adding object information to a database, and for generating and transmitting operating screen information to said client means; and
   execution means for monitoring the database, and for detecting object information that is to be processed and for processing the object information,
   wherein, if the operation performed by the user is a specific operation, said client means internally performs a process corresponding to the operation, instead of generating and transmitting a request for the performance of said process.

9. An information processing apparatus according to claim 8, wherein said client means generates operating screen information for a process performed by said client means, and provides said user said operating screen information.

10. An information processing apparatus according to claim 9, wherein said client means synthesizes said operating screen information generated by said client means with said operating screen information received from said server means, and provides said user the resultant information.

11. An information processing apparatus according to claim 10, wherein said client means determines whether a process is to be performed or whether a performance request is to be generated and transmitted, in accordance with whether said operating screen information concerning the operation selected by said user is generated by said client means, or is received from said server means.

12. An information processing apparatus according to claim 8, wherein said execution means performs the reading of information or the printing of information.

13. An information processing method comprising:
   an end instruction step of instructing termination of information processing;
   a request step of requesting a user to enter a password when termination is instructed by said end instruction step;
   an identification step of identifying a password entered by the user;
   a process termination step of terminating a process that is being executed and for returning control to an operating system when the termination is instructed and the identified password is a first predetermined password; and a shut-down step of shutting down the apparatus when the termination is instructed and the identified password is a second predetermined password.

14. An information processing method according to claim 13, wherein the first predetermined password is a password for the process for terminating the operation of an administrator.

15. An information processing method according to claim 13, wherein the second predetermined password is a password for a specific user.

16. An information processing method according to claim 13, wherein the information processing includes the reading of information or the printing of information.

17. An information processing method according to claim 13, further comprising:

a request step of generating and transmitting a performance request in a client process in accordance with an operation selected by a user;

a screen transmission step of, in a server process, interpreting the request and adding object information to a database and of generating and transmitting operating screen information to the client process;

an execution step of, in an execution process, monitoring the database and detecting object information that is to be processed, and of processing the object information;

a provision step of providing the user with the operating screen information in the client process, wherein, when the termination is instructed in said process termination step and said shut-down step, the operating screen information obtained at said provision step is generated for the user.

18. An information processing method according to claim 17, wherein, in the client process, the operating screen information generated by the client process is synthesized with the operating screen information received from the server process, and the user is provided with the resultant information.

19. An information processing method according to claim 17, wherein, in the client process, whether a process is to be performed or whether a performance request is to be generated and transmitted, is determined in accordance with whether the operating screen information concerning the operation selected by the user is generated by the client process, or is received from the server process.

20. An information processing method comprising the steps of:

a client process for generating and transmitting a request for performing a process in accordance with an operation performed by a user;

a server process for interpreting the request and adding object information to a database, and for generating and transmitting operating screen information to said client process; and an execution process for monitoring the database and detecting object information that is to be processed, and for processing the object information, wherein, in said client process, the operating screen information is received and provided for the user, and wherein if the operation performed by the user is a specific operation, a corresponding process corresponding to the operation is performed by said client process, instead of a request for the performance of said process being generated and transmitted.

21. An information processing method according to claim 20, wherein the operating screen information for a process performed in said client process is generated by said client process and is provided to the user.

22. An information processing method according to claim 20, wherein, in said client process, the operating screen information generated by said client process is synthesized with the operating screen information received from said server process, and the user is provided with the resultant information.

23. An information processing method according to claim 22, wherein the specific operation is an operation for obtaining the operating screen information generated by said client process.

24. An information processing method according to claim 20, wherein the reading of information or the printing of information is performed at said execution step.

25. A computer-readable storage medium on which a program for controlling a computer is stored, said program comprising codes for causing the computer to perform;

an end instruction step for instructing termination of information processing;

a request step of requesting a user to enter a password when termination is instructed by said end instruction step;

an identification step of identifying a password entered by said user;

a process termination step of terminating a process that is being executed and for returning control to an operating system when the termination is instructed and the identified password is a first predetermined password; and a shut-down step of shutting down the apparatus when the termination is instructed and the identified password is a second predetermined password.

26. A computer-readable storage medium on which a program for controlling a computer is stored, said program comprising:

a client process for, in accordance with an operation performed by a user, generating and transmitting a request for the performance of a process corresponding to the operation, and for receiving operating screen information and providing said operating screen information to said user;

a server process for interpreting said request and adding object information to a database, and for generating and transmitting operating screen information to said client process; and an execution process for monitoring said database and for detecting object information that is to be processed, and for processing said object information wherein, if the operation performed by said user is a specific operation, a corresponding process corresponding to the operation is performed by said client process, instead of a request for the performance of said process being generated and transmitted.

\* \* \* \* \*

UNITED STATES PATENT AND TRADEMARK OFFICE
CERTIFICATE OF CORRECTION

PATENT NO.  : 6,625,735 B2
DATED       : September 23, 2003
INVENTOR(S) : Suresh Jeyachandran et al.

It is certified that error appears in the above-identified patent and that said Letters Patent is hereby corrected as shown below:

Title page,
Item [56], References Cited, OTHER PUBLICATIONS, ""Device Exerciser having multiple Fixit Options, including a Lock Act"," should read -- Device Exerciser having multiple Exit Options, including a Lock Option", --.

Column 9,
Line 21, "database" should read -- database, --

Column 10,
Line 23, "perform;" should read -- perform: --.
Line 55, "information" should read -- information, --.

Signed and Sealed this

Thirtieth Day of March, 2004

JON W. DUDAS
*Acting Director of the United States Patent and Trademark Office*